United States Patent [19]
Shore et al.

[11] Patent Number: 6,134,930
[45] Date of Patent: Oct. 24, 2000

[54] LUBRICATION SYSTEM

[75] Inventors: T. Michael Shore, Princeton; Melicher Puchovsky, Dudley, both of Mass.

[73] Assignee: Morgan Construction Company, Worcester, Mass.

[21] Appl. No.: 09/491,858

[22] Filed: Jan. 26, 2000

[51] Int. Cl.$^7$ .............................. B21B 45/02; B21B 13/12
[52] U.S. Cl. ................................. 72/43; 72/235
[58] Field of Search .................................. 72/237, 39, 40, 72/43, 44, 236; 184/6, 6.1, 6.21, 7.4; 137/2, 262, 268, 544, 571, 572

[56] References Cited

U.S. PATENT DOCUMENTS

| | | | |
|---|---|---|---|
| 3,578,111 | 5/1971 | Miller | 184/6 |
| 3,618,707 | 11/1971 | Sluhan | 72/42 |
| 4,537,055 | 8/1985 | Woodrow et al. | 72/235 |
| 5,224,051 | 6/1993 | Johnson | 72/42 |
| 5,577,405 | 11/1996 | Shore et al. | 72/235 |
| 5,971,107 | 10/1999 | Stitz et al. | 184/7.4 |
| 6,001,245 | 12/1999 | Reich et al. | 184/6.24 |

*Primary Examiner*—Rodney A. Butler
*Attorney, Agent, or Firm*—Samuels, Gauthier & Stevens

[57] ABSTRACT

A system is disclosed for applying a liquid lubricant to first and second components enclosed in a housing, with the lubricant applied to the second components being exposed to contamination by a liquid coolant applied to the exterior of the housing, and with the lubricant applied to the first components being substantially isolated from the liquid coolant. The system includes a partition internally subdividing the housing into a first chamber containing the first components and a second chamber containing the second components. Lubricant is delivered from a storage tank to the housing for application to the first and second components. A first conduit network communicates with the first chamber for returning the lubricant applied to the first components to the storage tank, and a second conduit network communicates with the second chamber for returning lubricant applied to the second components to the storage tank. A liquid coolant removal unit in the second conduit network removes liquid coolant from the lubricant being returned to the storage tank.

8 Claims, 4 Drawing Sheets

LUBRICATION SYSTEM

BACKGROUND OF THE INVENTION

1. Field of the Invention

This invention relates generally to lubrication systems, and is concerned in particular with although not limited to rolling mill lubrication systems where a liquid lubricant is applied to multiple components and where some but not all of the thus applied lubricant is susceptible to being contaminated by externally applied cooling water and entrained particulates, e.g., dirt, mill scale, etc.

2. Description of the Prior Art

In a conventional rolling mill lubrication system, for example that employed with a high speed finishing block of the type described in U.S. Pat. No. 5,577,405 (Shore et al.), a liquid lubricant is pumped from remote storage tanks for delivery to the individual roll stands, where it is applied via internal networks to the bearings, gears and other associated components housed within the roll stands. At the same time, cooling water is continuously applied externally to the work rolls and associated guides.

The majority of the internal components, e.g., drive shaft bearings, bevel and pinion gear sets, etc., are substantially isolated from the external environment, and thus the lubricant being applied to those components is not likely to become contaminated by the externally applied cooling water and any entrained dirt and mill scale.

However, certain other components are vulnerable to contamination. This is particularly true of the work side roll shaft bearings which are located directly adjacent to the work rolls, and which are separated from externally applied cooling water and entrained particulates by complicated seal assemblies. As the seal assemblies undergo normal wear, sealing integrity is compromised, resulting in contamination of the lubricant being applied to the work side shaft bearings. The lubricant applied to those particular bearings accounts for only about 10–15% of the total lubricant being supplied to each roll stand.

Conventionally, each roll stand is provided with a single outlet through which all of the lubricant supplied to that stand is drained and returned to the system storage tanks. With this arrangement, the relatively small amount of contaminated lubricant from the work side roll shaft bearings is mixed in with all of the returning lubricant, which results therefore in all of the returning lubricant being contaminated. Thus, large capacity storage tanks are required to provide adequate dwell time for contaminating particulates to settle out through gravity, and high capacity vacuum dehydrators or centrifuges are required to remove the contaminating water. By way of example, a conventional lubrication system servicing an eight stand finishing block will require two 21,000 liter storage tanks and vacuum dehydrators or centrifuges having power ratings on the order of 90 kw. Installations of this type and size are expensive and costly to operate and maintain.

SUMMARY OF THE INVENTION

In accordance with the present invention, the housings of the individual roll stands are internally partitioned into first and second chambers. The small number of components likely to be exposed to externally applied cooling water and entrained particulates are located in the second chambers, with all of the other components being located in the first chambers. The first and second chambers are separately drained and connected respectively to separate first and second return networks leading back to a primary storage tank. A smaller secondary storage tank and associated water removal unit is provided in the second return network to remove water from only that portion of the lubricant previously applied to the components located in the second housing chambers. Since the lubricant being treated for water removal is only a small fraction of the total being circulated through the system, considerable savings can be realized in both capital expenditures and operating costs. For example, with a lubrication system in accordance with the present invention, the same eight stand finishing block referenced above can be serviced with a 10,000 liter primary storage tank, a 3,300 liter secondary storage tank, and a vacuum dehydrator or centrifuge with a lower rating on the order of 10 kw.

These and other features and advantages of the present invention will now be described in greater detail with reference to the accompanying drawings, wherein:

DETAILED DESCRIPTION OF PREFERRED EMBODIMENT

Figure 1:
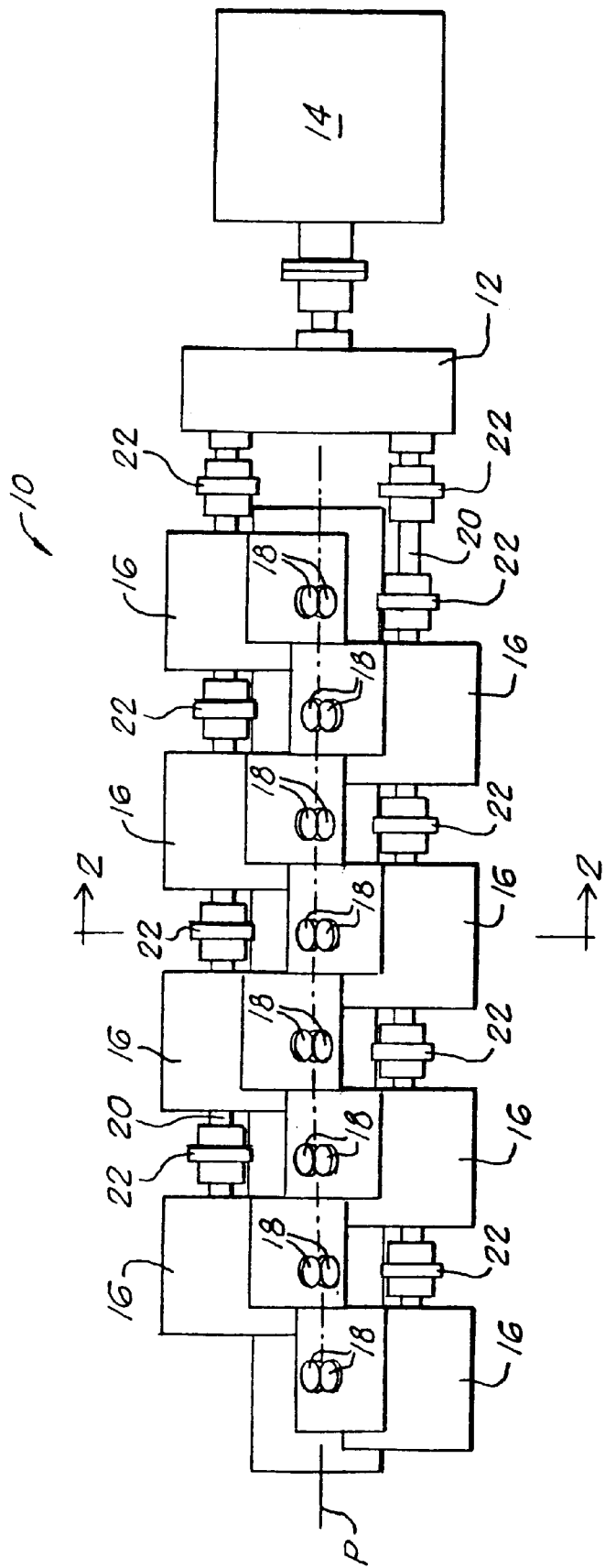
FIG. 1 is a plan view of a high speed rod finishing block of the type serviced by a lubrication system in accordance with the present invention.

Referring initially to FIG. 1, a high speed finishing block is shown at 10. The block is powered via a gear-type speed increaser 12 by a drive motor 14.

Figure 2:
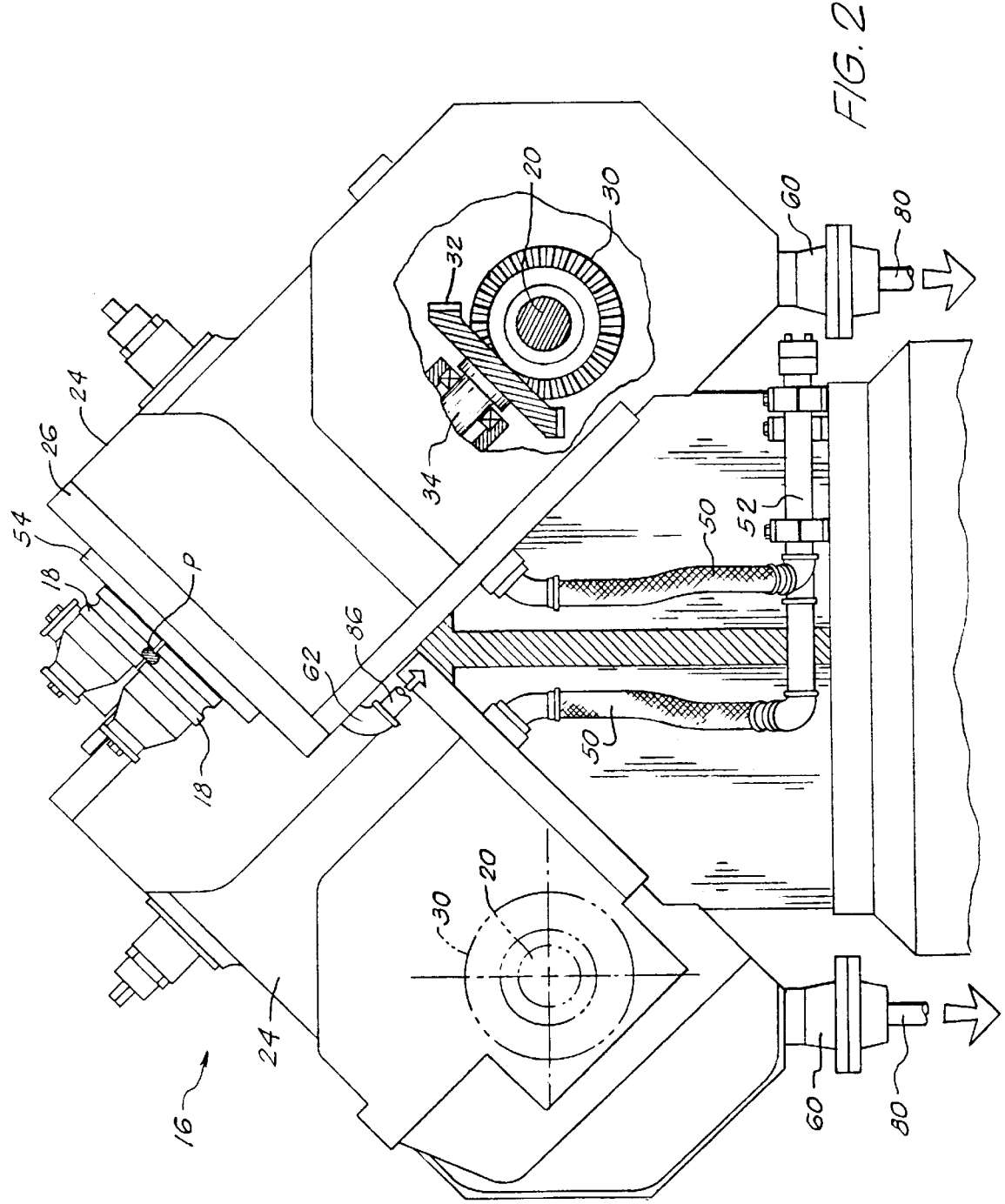
FIG. 2 is a sectional view on an enlarged scale taken along line 2—2 of FIG. 1.
Figure 3:
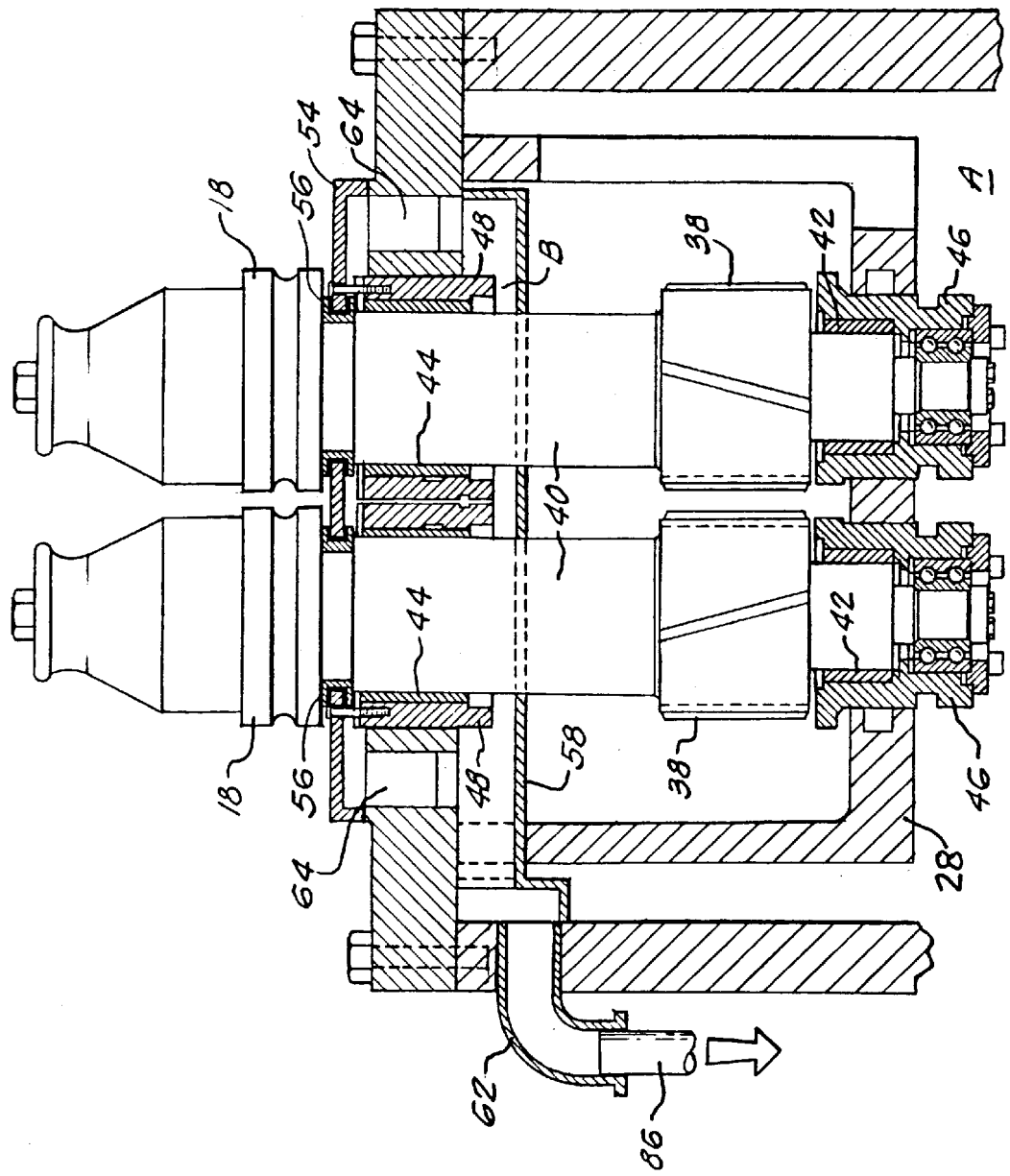
FIG. 3 is a further enlarged sectional view through the upper portion of one of the roll stands shown in FIG. 2.
Figures 4, 5:
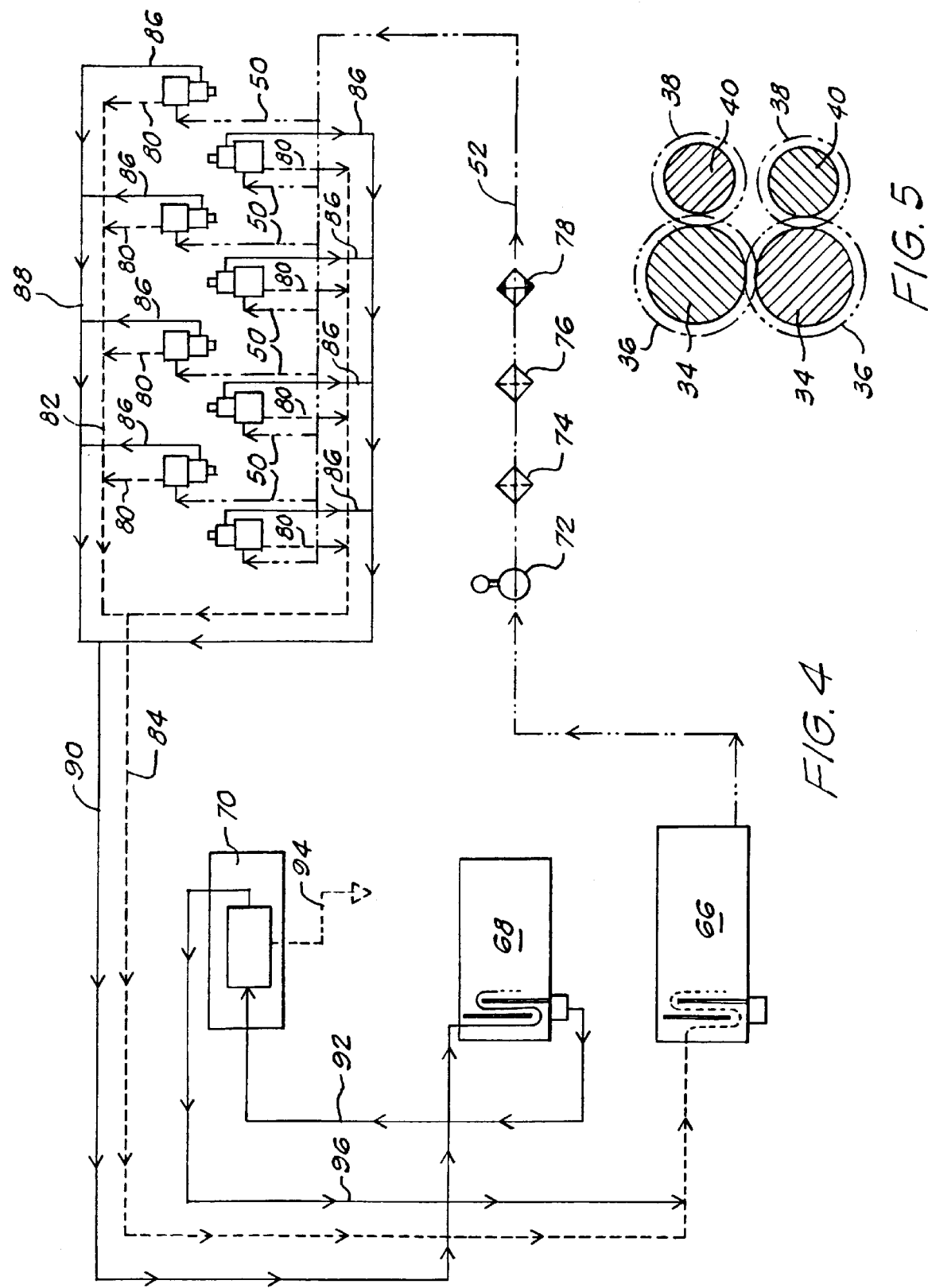
FIG. 4 is a diagrammatic illustration of a lubrication system in accordance with the present invention.
FIG. 5 is a diagrammatic illustration of a typical four gear cluster used to drive the roll shafts of each roll stand.

With reference additionally to FIGS. 2, 3 and 5, it will be seen that the block includes a succession of roll stands 16 alternately staggered on opposite sides of the mill pass line P. The roll stands have cantilevered pairs of work rolls 18 alternately offset by 90° in order to effect twist free rolling of products. The successive roll stands on each side of the pass line are mechanically coupled one to the other and to the speed increaser 12 by line shaft segments 20 interconnected by couplings 22.

Each roll stand 16 includes a housing 24 closed at its upper end by a front plate 26 supporting an internally protruding open sided cartridge body 28. Within each housing 24, the respective line shaft segment 20 carries a bevel gear 30 meshing with a mating bevel gear 32 on one of a pair of parallel drive shafts 34. The drive shafts carry intermeshed gears 36, which in turn mesh with driven gears 38 on roll shafts 40.

The roll shafts 40 are journalled for rotation in drive and work side sleeve bearings 42, 44. The sleeve bearings are fixed within eccentric sleeves 46, 48, which in turn are rotatably supported in the cartridge body 28. The roll shafts 40 protrude through openings in the front plate 26, and the work rolls 18 are supported in cantilever fashion on the exposed ends of the roll shafts.

Lubricant is fed to each of the roll stands through flexible hoses 50 connected to a feed line 52. Although not shown, it will be understood that the hoses 50 communicate with an internal network of strategically located passageways in the housing 24, front plate 26 and cartridge body 28 to direct the lubricant where required to lubricate the gears, bearings and other rotatable components located within each roll stand.

During rolling, cooling water is continuously sprayed on the work rolls. A seal plate 54 and shaft seals 56 are positioned to exclude the cooling water and entrained dirt and mill scale from penetrating into the housing 24. However, as mentioned previously, as the seals 56 undergo normal wear, their effectiveness is gradually compromised, resulting in the cooling water and entrained particulates eventually penetrating past the front plate to contaminate the lubricant being applied continuously to the work side sleeve bearings 44.

Other internal components, e.g., the gears 36, 38, 30, 32 drive side bearings 42, etc. are substantially isolated from the externally applied cooling water. Thus, there is little if any likelihood that the lubricant applied to these components will become contaminated.

In accordance with the present invention, the roll stand housings are internally subdivided by appropriately configured partitions 58 into first and second chambers A, B. The internal components that are relatively immune from cooling water contamination are located in the first chamber A, leaving those that are likely to be exposed in the second chamber B. The chambers A, B are provided respectively with separate drains 60, 62. Chamber B communicates with the underside of the seal plate 54 via openings 64 in the front plate 26.

FIG. 4 depicts a closed loop pressurized lubrication system in accordance with the present invention. The system includes a primary storage tank 66, a smaller secondary storage tank 68 and a water removal unit 70 which typically will comprise a vacuum dehydrator or centrifuge of the type known to those skilled in the art.

Lubricant is fed from the primary storage tank 66 to each of the roll stands 16 via the feed line 52 and the flexible branch hoses 50. A pump 72, filters 74, 76 and a cooling unit 78 are located along feed line 52.

Water-free lubricant is received from the roll stands via drains 60, and is returned directly to the primary storage tank 66 by a first return network which includes branch lines 80, a return manifold 82 and a return header 84.

Water-contaminated lubricant is received from the roll stands via drains 62, and is returned to the smaller secondary storage tank 68 via a second return network which includes branch lines 86, a return manifold 88 and a return header 90. The water contaminated lubricant is directed from the secondary storage tank 68 via line 92 to the water removal unit 70 where the contaminating water is removed and drained off through discharge line 94. The water-free lubricant is then directed on to the primary storage tank 66 via line 96.

Those familiar with rolling mills will recognize that the main source of dirt ingress is that which is entrained in the cooling water which penetrates past the work side shaft seals. With the present invention, that dirt and contaminating water is isolated from the bulk of the lubricant being circulated through the mill. Dirt and water are removed expediently from the relatively small volume of lubricant being diverted to the smaller secondary storage tank 68. This enhances the cleanliness of the lubricant in the primary storage tank 66, and thereby prevents particulate contaminants from coming into contact with the moving elements in the mill. Other advantages include longer lubricant life, reduced condensation in the primary storage tank and roll stand housings, and a less frequent need to clean the larger primary storage tank.

Although the present invention has been described with reference to lubrication systems for rolling mill finishing blocks, those skilled in the art will recognize its adaptability to other environments where closed lubrication systems are servicing machines with multiple moving components, only some of which are exposed to external contaminants.

We claim:

1. A system for applying a liquid lubricant to first and second components enclosed in a housing, with the lubricant applied to said second components being exposed to contamination by a liquid coolant applied to the exterior of said housing, and with the lubricant applied to said first components being substantially isolated from said liquid coolant, said system comprising:

partition means for internally subdividing said housing into a first chamber containing said first components and a second chamber containing said second components;

storage means for storing a supply of said lubricant;

delivery means for delivering lubricant from said storage means to said housing for application to said first and second components;

first return means communicating with said first chamber for returning the lubricant applied to said first components to said storage means;

second return means communicating with said second chamber for returning lubricant applied to said second components to said storage means; and liquid coolant removal means in said second return means for removing liquid coolant from the lubricant being returned to said storage means.

2. The system as claimed in claim 1 wherein said delivery means includes means for pumping said lubricant.

3. The system as claimed in claim 1 wherein said delivery means includes means for cooling said lubricant.

4. The system as claimed in claim 1 wherein said delivery means includes means for filtering particulate contaminants from said lubricant.

5. The system as claimed in claim 1 further comprising second storage means in said second return means for temporarily storing contaminated lubricant in advance of said liquid coolant removal means.

6. The system as claimed in claim 5 wherein a lesser amount of lubricant is applied to said second components as compared to that applied to said first components, and wherein the storage capacity of said second storage means is less than that of said first mentioned storage means.

7. In a rolling mill, a closed system for applying a liquid lubricant to first and second components contained in the housings of a plurality of successive roll stands, with the lubricant applied to said second components being exposed to contamination by cooling water applied to the exterior of said housings, and with the lubricant applied to said first components being substantially isolated from said cooling water, said system comprising:

means for internally subdividing said housings into first chambers containing said first components and second chamber containing said second components;

storage means remote from said roll stands for storing a supply of said lubricant;

delivery means for delivering lubricant from said storage means to each of said housings for application to the first and second components contained therein;

first return means connecting the first chambers of each of said housings to said storage means for returning lubricant applied to said first components to said storage means;

second return means connecting the second chambers of each of said housings to said storage means for returning lubricant applied to said second components to said storage means; and means for removing cooling water from the lubricant being returned to said storage means via said second return means.

8. A method of applying a liquid lubricant to first and second components enclosed in a housing, with the lubricant applied to said second components being exposed to contamination by cooling water applied to the exterior of said housing, and with the lubricant applied to said first components being substantially isolated from said cooling water, said method comprising:

internally subdividing said housing into a first chamber containing said first components and a second chamber containing said second components;

storing a supply of said lubricant at a location remote from said housing;

delivering lubricant from said storage means to said housing for application to said first and second components;

returning the lubricant applied to said first components to said storage means;

returning lubricant applied to said second components to said storage means; and removing cooling water from the lubricant being returned to said storage means following application to said second components.

* * * * *